(12) United States Patent
Dähler et al.

(10) Patent No.: US 6,822,883 B2
(45) Date of Patent: Nov. 23, 2004

(54) CONVERTER CIRCUIT ARRANGEMENT, AS WELL AS A METHOD FOR MATCHING A VARIABLE DC VOLTAGE

(75) Inventors: Peter Dähler, Remigen (CH); Osvin Gaupp, Baden (CH)

(73) Assignee: ABB Schweiz AG, Baden (CH)

(*) Notice: Subject to any disclaimer, the term of this patent is extended or adjusted under 35 U.S.C. 154(b) by 25 days.

(21) Appl. No.: 10/247,372

(22) Filed: Sep. 20, 2002

(65) Prior Publication Data

US 2003/0086281 A1 May 8, 2003

(30) Foreign Application Priority Data

Sep. 27, 2001 (EP) ............................................. 01810944

(51) Int. Cl.⁷ ............................................. H02H 7/122

(52) U.S. Cl. ........................................ 363/58; 363/136

(58) Field of Search ............................. 363/40, 57, 58, 363/135, 136

(56) References Cited

U.S. PATENT DOCUMENTS

| | | | | |
|---|---|---|---|---|
| 3,707,668 | A | * 12/1972 | Johnston | 363/137 |
| 4,855,893 | A | * 8/1989 | Kratz | 363/136 |
| 4,881,159 | A | * 11/1989 | Holtz et al. | 363/58 |
| 4,926,306 | A | * 5/1990 | Ueda et al. | 363/58 |
| 5,115,389 | A | * 5/1992 | Ouchi et al. | 363/125 |
| 5,400,242 | A | * 3/1995 | Ando et al. | 363/136 |
| 6,072,707 | A | * 6/2000 | Hochgraf | 363/71 |
| 6,188,589 | B1 | * 2/2001 | Okayama et al. | 363/58 |

FOREIGN PATENT DOCUMENTS

JP 2000287441 10/2000

OTHER PUBLICATIONS

T. Schutze, et al., "Low Floor Trams With IGBT–3–Level Inverter", The European Power Electronics Association, Sep. 13, 1993, pp. 92–96.

S. Tamai, et al., "3 Level GTO Converter–Inverter Pair System for Large Capacity Induction Motor Drive", The European Power Electronics Association, Sep. 13, 1993, pp. 45–50.

* cited by examiner

Primary Examiner—Bao Q. Vu
(74) Attorney, Agent, or Firm—Burns, Doane, Swecker & Mathis, L.L.P.

(57) ABSTRACT

A converter circuit arrangement is disclosed for matching a variable DC voltage to a drive circuit for producing drive signals and having a three-point DC voltage intermediate circuit (2), which three-point DC voltage intermediate circuit (2) is formed by a first capacitor (3) and a second capacitor (4) connected in series with it, with one connection of the first capacitor (3) forming an upper connection (5) of the three-point DC voltage intermediate circuit (2), and the first capacitor (3) forming a center point connection (6) at the junction point with the second capacitor (4) and one connection of the second capacitor (4) forming a lower connection (7) of the three-point DC voltage intermediate circuit (2). A first partial converter system (8) and a second partial converter system (9) are provided, with the input side of the first partial converter system (8) being connected to a first pole (10) of a DC voltage source (11) which produces the DC voltage, and the input side of the second partial converter system (9) being connected to a second pole (12) of the DC voltage source (11), a first output (13) of the first partial converter system (8) being connected to the upper connection (5), and a first output (14) of the second partial converter system (9) being connected to the lower connection (7). Furthermore, a second output (15) of the first partial converter system (8) is connected in series with a second output (16) of the second partial converter system (9) via the center point connection (6). A method for matching a variable DC voltage is also specified.

14 Claims, 3 Drawing Sheets

CONVERTER CIRCUIT ARRANGEMENT, AS WELL AS A METHOD FOR MATCHING A VARIABLE DC VOLTAGE

FIELD OF THE INVENTION

The invention relates to the field of power electronics and is based on a converter circuit arrangement and a method for matching a variable DC voltage as claimed in the precharacterizing clause of the independent claims.

BACKGROUND OF THE INVENTION

Two-pole DC voltages sources having a variable DC voltage on the output side are known, for example, from fuel cell applications, with the fuel cell representing such a DC voltage source with a variable DC voltage. Normally, owing to the different DC voltage level, such a DC voltage source feeds a three-point DC voltage intermediate circuit, which is formed by a first capacitor and a second capacitor connected in series with it. One connection of the first capacitor furthermore forms an upper connection of the three-point DC voltage intermediate circuit, and one connection of the second capacitor forms a lower connection of the three-point DC voltage intermediate circuit. Furthermore, a center point connection of the three-point DC voltage intermediate circuit is formed at the junction point of the first capacitor and the second capacitor. A three-point converter circuit, which has a drive circuit for producing drive signals, is normally connected to the upper connection, to the center connection and to the lower connection of the three-point DC voltage intermediate circuit, with power switches in the three-point converter circuit being driven on the basis of drive signals. The three-point converter circuit allows electrical power from the DC voltage source to be fed, for example, into an electrical AC voltage supply network.

One problem with a three-point converter circuit such as this is that power switches in the three-point converter circuit must be designed to switch a wide range of DC voltage from the DC voltage source to this range, in particular in terms of power. However, this result in considerable costs, in which case consideration must also be given to providing a sufficient voltage margin in the design. However, such voltage margins are at the moment provided only by very expensive components, and/or this can be done only with a major level of circuit complexity. Since the DC voltage source is connected directly to the three-point DC voltage intermediate circuit, the intermediate circuit voltage is correlated with the variable DC voltage, so that controlled power transmission into an electrical AC voltage supply network is possible only via a costly and complicated drive circuit for driving the power switches in the three-point converter circuit.

SUMMARY OF THE INVENTION

One object of the invention is therefore to specify a converter circuit arrangement for matching a variable DC voltage, by means of which an essentially constant intermediate circuit voltage can be produced in a three-point DC voltage intermediate circuit. A further object is to specify a method for matching the variable DC voltage, by means of which the essentially constant intermediate circuit voltage is generated in a particularly simple manner. These objects are achieved by the features in claims 1 and 9. Further developments of the invention are specified in the dependent claims.

The converter circuit arrangement according to the invention for matching a variable DC voltage has a drive circuit for producing drive signals, and a three-point DC voltage intermediate circuit. The three-point DC voltage intermediate circuit is formed by a first capacitor and a second capacitor connected in series with it, with one connection of the first capacitor forming an upper connection of the three-point DC voltage intermediate circuit, and the first capacitor forming a center point connection at the junction point with the second capacitor. Furthermore, one connection of the second capacitor forms a lower connection of the three-point DC voltage intermediate circuit. According to the invention, a first partial converter system and a second partial converter system are provided, with the input side of the first partial converter system being connected to a first pole of a DC voltage source which produces the DC voltage, and the input side of the second partial converter system being connected to a second pole of the DC voltage source. Furthermore, a first output of the first partial converter system is connected to the upper connection, and a first output of the second partial converter system is connected to the lower connection. In addition, a second output of the first partial converter system is connected in series with a second output of the second partial converter system via the center point connection. The converter circuit arrangement according to the invention advantageously makes it possible to generate an essentially constant intermediate circuit voltage in the DC voltage intermediate circuit, with the first partial converter system essentially producing a constant first intermediate circuit voltage across the first capacitor, and the second partial converter system essentially producing a constant intermediate circuit voltage across the second capacitor. Power capacitors in a three-point converter circuit which is fed from the three-point DC voltage intermediate circuit may thus be designed for the essentially constant intermediate circuit voltage and need not be derated to provide a large voltage margin, thus making it possible to save considerable costs. Furthermore, there is no need for a costly and complicated drive circuit for driving the power switches in the three-point converter circuit, in order to allow controlled power transmission to an electrical AC voltage supply network. In addition, the converter circuit arrangement manages with a minimum number of components, and can be produced with a low level of circuit complexity. Furthermore, the converter circuit arrangement according to the invention is regarded as being convenient for maintenance and repair, owing to the simple construction and the small number of components.

In the method according to the invention for matching the variable DC voltage by means of the converter circuit arrangement according to the invention as described above, the first partial converter system is driven such that the first intermediate circuit voltage is set to an intermediate circuit voltage nominal value which can be predetermined. Furthermore, the second partial converter system is driven such that the second intermediate circuit voltage is set to the intermediate circuit voltage nominal value which can be predetermined. This way of driving the partial converter systems advantageously produces an essentially constant intermediate circuit voltage, in particular the first and second intermediate circuit voltages, in a very simple manner. The three-point converter circuit which is normally connected to the three-point DC voltage intermediate circuit accordingly and advantageously does not require any complicated drive procedure, designed for a variable DC voltage, for the power switches in the three-point converter circuit. Furthermore, the three-point DC voltage intermediate circuit can be successfully stabilized using the method according to the invention.

These and further objects, advantages and features of the present invention will become evident from the following detailed description of preferred exemplary embodiments of the invention, in conjunction with the drawing.

Figure 1:
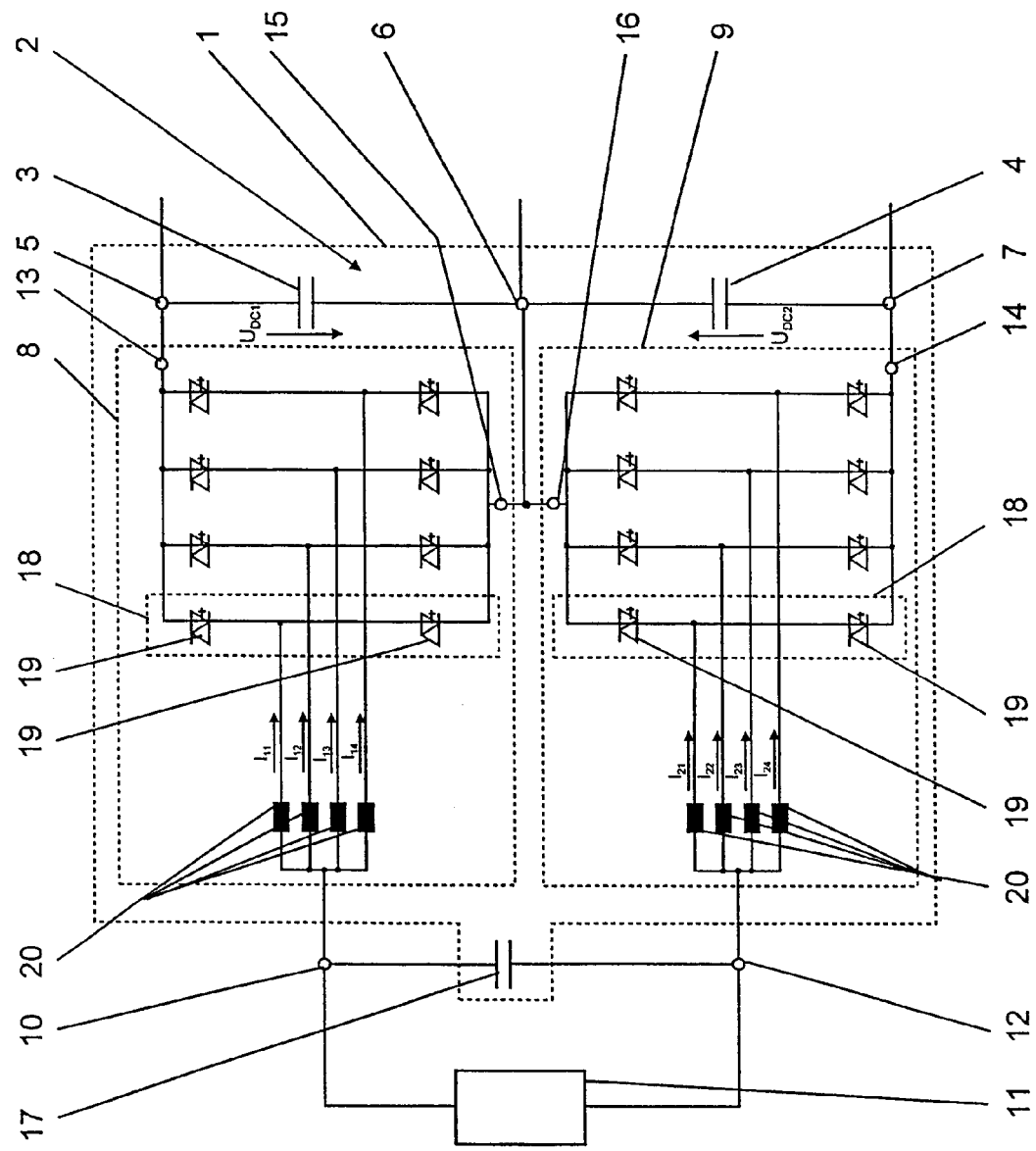
FIG. 1 shows a first embodiment of a converter circuit arrangement according to the invention.

The reference symbols used in the drawing and their meanings are listed in summarized form in the list of reference symbols. In principle, identical parts are provided with the same reference symbols and figures. The described embodiments represent examples of the subject matter of the invention and have no restrictive effect.

DETAILED DESCRIPTION OF THE INVENTION

Figure 3:
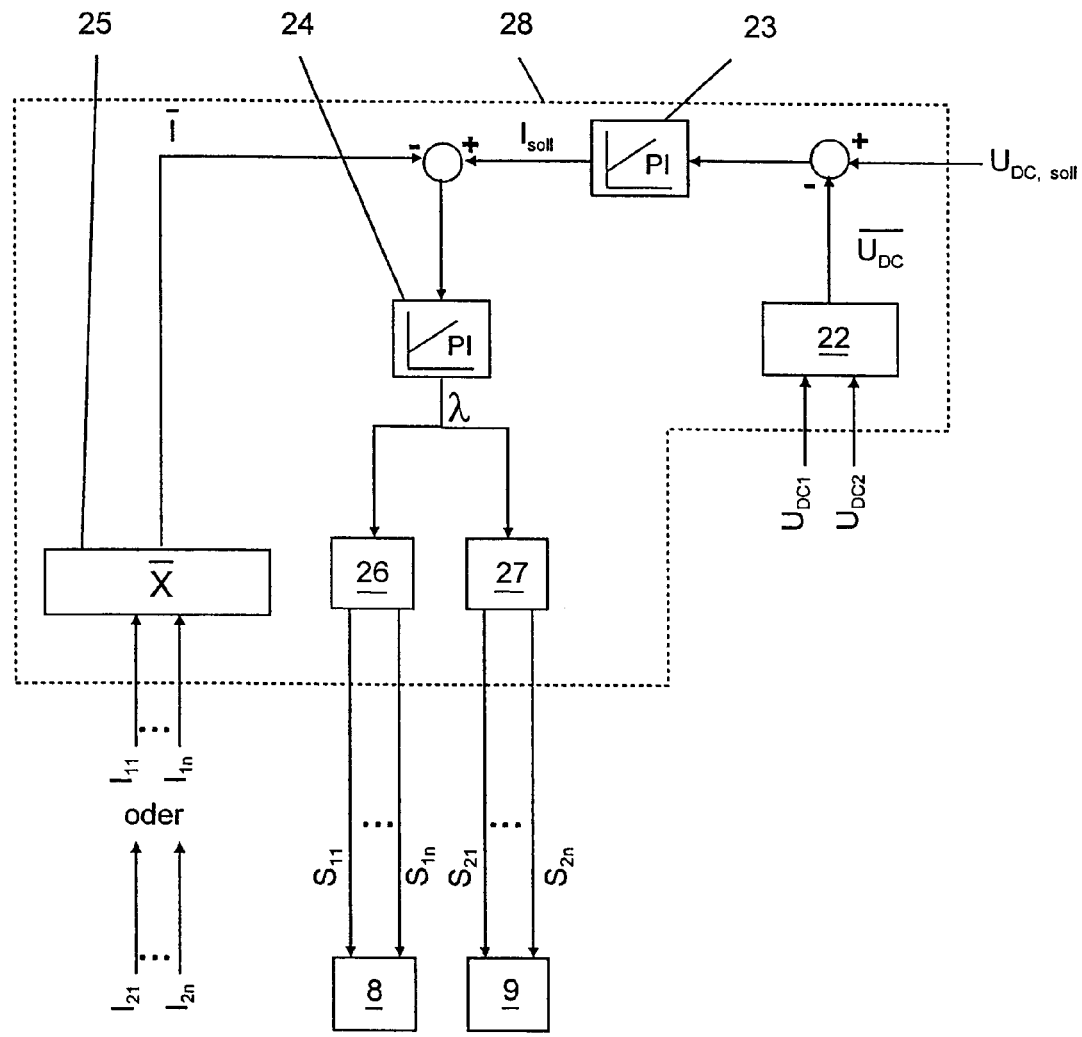
FIG. 3 shows an embodiment of a drive circuit of a converter circuit arrangement according to the invention.

FIG. 1 shows a first embodiment of a converter circuit arrangement 1 according to the invention for matching a variable DC voltage. The converter circuit arrangement 1 comprises a drive circuit 28 for producing drive signals $S_{11}$, ... $S_{1n}$; $S_{21}$ ... $S_{2n}$, and one embodiment of such a drive circuit 28 is illustrated in FIG. 3 and will be described later. Furthermore, the converter circuit arrangement 1 has a three-point DC voltage intermediate circuit 2, which is formed by a first capacitor 3 and a second capacitor 4, connected in series with it, with one connection of the first capacitor 3 forming an upper connection 5 of the three-point DC voltage intermediate circuit 2. Furthermore, the first capacitor 3 forms a center point connection 6 at the junction point with the second capacitor 4. In addition, one connection of the second capacitor 4 forms a lower connection 7 of the three-point DC voltage intermediate circuit 2.

According to the invention, the converter circuit arrangement 1 comprises a first partial converter system 8 and a second partial converter system 9, the input side of which first partial converter system 8 is connected to a first pole 10 of a DC voltage source 11 which produces the DC voltage. According to FIG. 1, the input side of the second partial converter system 9 is connected to a second pole 12 of the DC voltage source 11. Furthermore, a first output 13 of the first partial converter system 8 is connected to the upper connection 5, and a first output 14 of the second partial converter system 9 is connected to the lower connection 7. In addition, according to the invention, a second output 15 of the first partial converter system 8 is connected in series with a second output 16 of the second partial converter system 9 via the center point connection 6. The first partial converter system 8 advantageously makes it possible to set a first intermediate circuit voltage $U_{DC1}$ which is produced on the first capacitor 3, and the second partial converter system 9 advantageously makes it possible to set an intermediate circuit voltage $U_{DC1}$, which is produced on the second capacitor 4, to an essentially constant value, so that it is possible to produce an essentially constant intermediate circuit voltage across the two capacitors 3, 4, although this is not shown in FIG. 1, for the sake of clarity. Thus, by way of example, converter circuits which are connected to the three-point DC voltage intermediate circuit 2, in particular three-point converter circuits, can further process the matched DC voltage from the DC voltage source 11 without any problems, so that there is no need for either specific designs of the three-point converter circuits nor for a costly and complicated drive circuit for such three-point converter circuits.

According to the invention, the converter circuit arrangement 1 has a capacitive energy store 17, which is connected to the first pole 10 and to the second pole 12 in parallel with the DC voltage source 11. This capacitive energy store 17 is advantageously used for temporary storage of electrical energy from the DC voltage source 11. A further advantage of the capacitive energy store 17 is that it allows harmonic reactions to be reduced.

Furthermore, as shown in FIG. 1, each partial converter system 8, 9 is formed from n parallel-connected branch pairs 18 where n=3, 4, 5 . . . and, according to the first embodiment of the converter circuit arrangement 1 according to the invention, and as shown in FIG. 1, n=4. According to the invention, each branch pair 18 is formed from two series-connected power semiconductor switches 19 which can be driven, with each power semiconductor switch 19 advantageously having an integrated drive-electrode-commutated thyristor or a bipolar transistor with a drive electrode arranged in an isolated manner. The two partial converter systems 8, 9, which are connected in series via the center point connection 6 in the manner described above, advantageously result in only even-numbered harmonic oscillations being produced in the current via the first pole 10 and the second pole 12 with respect to a switching frequency $f_S$ of the power semiconductor switches 19 in each branch pair 18. The order of the harmonic oscillations is accordingly given by $$r=2 \cdot n \cdot i,$$

where r is the order, n is the number of branch pairs 18 in each partial converter system 8, 9, and i=1, 2, 3, . . . The associated frequency $f_{H,i}$ of the corresponding harmonic oscillation is then given by $$f_{H,i}=r \cdot f_S$$

An increase in the number n of branch pairs 18 in each partial converter system 8, 9 thus advantageously leads to an increase in the frequency $f_{H,i}$ of the corresponding harmonic oscillation, which is desirable on the basis of the specified values for the current reference from the DC voltage source.

According to the invention, each branch pair 18 in the first partial converter system 8 is connected, as shown in FIG. 1, to the first pole 10 via a smoothing inductance 20 which is connected to the junction point of the series-connected power semiconductor switches 19. Furthermore, each branch pair 18 in the second partial converter system 9 is connected to the second pole 12 via a smoothing inductance 20, which is connected to the junction point of the series-connected power semiconductor switches 19. The smoothing inductance 20 results in n currents flowing in each partial converter system 8, 9 where, as shown in FIG. 1, n=4, being smooth, so that the amplitudes of the harmonics mentioned above can advantageously be reduced.

Figure 2:
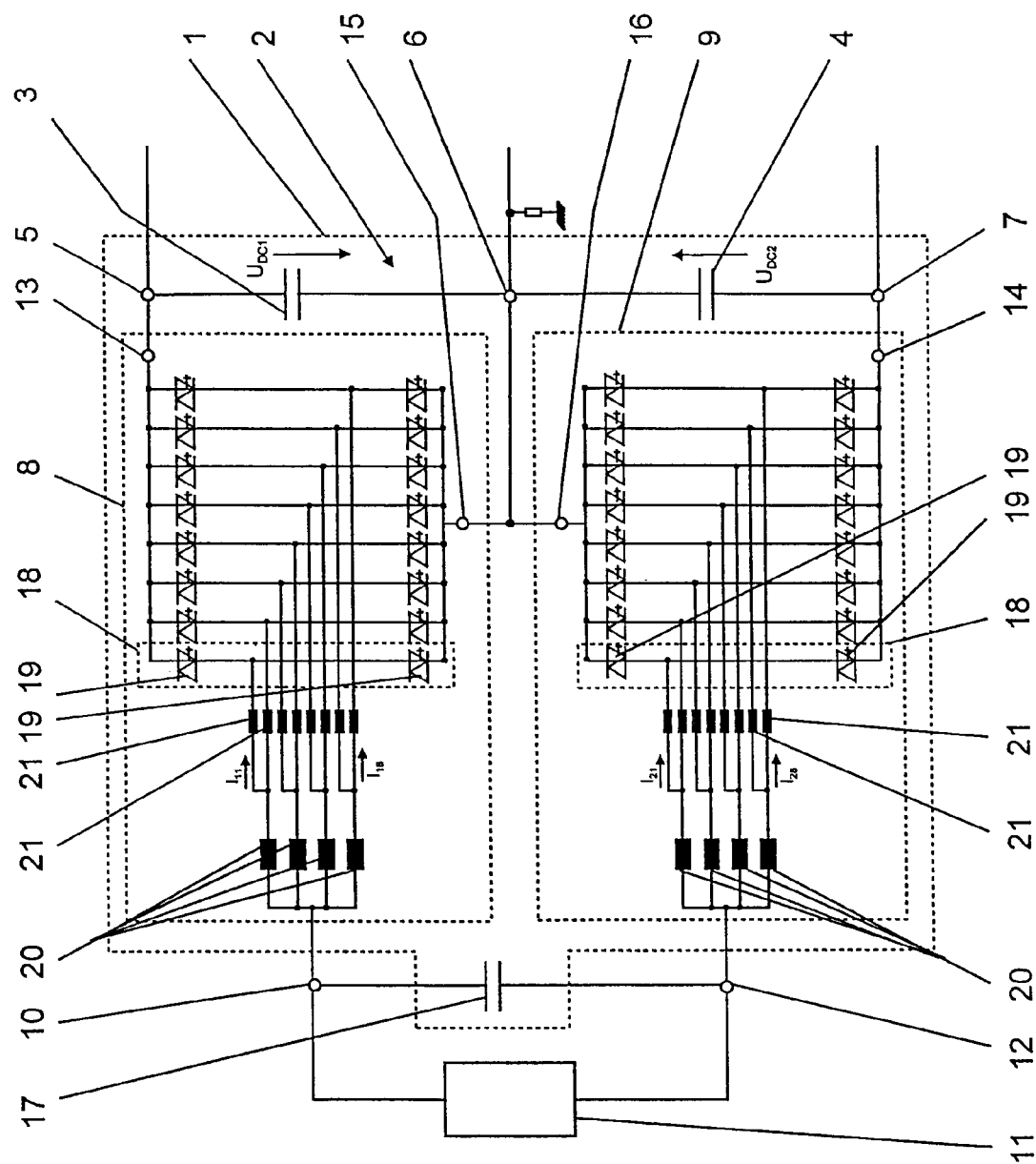
FIG. 2 shows a second embodiment of a converter circuit arrangement according to the invention.

FIG. 2 shows a second embodiment of the converter circuit arrangement 1 according to the invention. In this case, the number of branch pairs 18 is chosen to be n=8. The center point connection 6 is preferably grounded, in order that an essentially fixed reference potential, namely the ground potential, can be produced at the center point connection 6. Such grounding is provided either directly, that is to say rigidly or via a grounding resistance as shown in FIG.

2. According to FIG. 2, a branch pair inductance 21 in the first partial converter system 8 is connected to the series-connected power semiconductor switches 19 in each branch pair 18 of the first partial converter system 8, with at least two branch pair inductances 21 being connected to one another. Furthermore, a branch pair inductance 21 in the second partial converter system 9 is connected to the junction point of the series-connected power semiconductor switches 19 in the branch pairs 18 of the second partial converter system 9, with at least two branch pair inductances 21 being connected to one another. The branch pair inductances 21 make it possible to smooth equalizing currents $I_{11}, \ldots I_{1n}; I_{21} \ldots I_{2n}$, where n=8, between the branch pairs 18 in each partial converter system 8, 9, which are connected to one another via the branch pair inductances 21. Furthermore, the branch pair inductances 21 are used to limit the equalizing currents $I_{11}, \ldots I_{1n}; I_{21} \ldots I_{2n}$ which occur, where n=8, if the power semiconductor switches 19 and hence the branch pairs 18, do not switch at the ideal times. Furthermore, a smoothing inductance 20, which is connected to the first pole 10, is connected to the junction point of the mutually connected branch pair inductances 21 in the first partial converter system 8. A smoothing inductance 20, which is connected to the second pole 12, is likewise connected to the junction point of the mutually connected branch pair inductances 21 in the second partial converter system 9. The smoothing inductances 20 in the second embodiment of the converter circuit arrangement 1 according to the invention and as shown in FIG. 2 are the same type of smoothing inductances 20 as in the first embodiment (described above) of the converter circuit arrangement 1 according to the invention and as shown in FIG. 1, so that the smoothing inductances 20 as shown in FIG. 2 likewise smooth the currents flowing in each partial converter system 8, 9.

The smoothing inductances 20 in both embodiments of the converter circuit arrangement 1 according to the invention and as shown in FIG. 1 and FIG. 2 are thus advantageously used to reduce the currents that the power semiconductor switches 19 need to handle. Furthermore, the smoothing inductances 20 result in a reduction in the harmonic reactions on the DC voltage source 11.

In the method according to the invention for matching the variable DC voltage by means of the converter circuit arrangement 1 according to the invention and as described above, the first partial converter system 8 is driven by means of the embodiment of the drive circuit 28 as illustrated in FIG. 3 such that the first intermediate circuit voltage $U_{DC1}$ is set to an intermediate circuit voltage nominal value $U_{DC, nom}$ which can be predetermined. Furthermore, according to the invention, the second partial converter system 9 is driven such that the second intermediate circuit voltage $U_{DC2}$ is set to the intermediate circuit voltage nominal value $U_{DC, nom}$ which can be predetermined. Driving the partial converter systems 8, 9 in this way results in an essentially constant first and second intermediate circuit voltage $U_{DC1}$, $U_{DC2}$ in a very simple manner, so that an essentially constant intermediate circuit voltage, which is produced across the two capacitors 3, 4 but is not shown in FIG. 1 or FIG. 2 for the sake of clarity, can be generated in a particularly simple manner. Furthermore, a three-point converter circuit, which is normally connected to the three-point DC voltage intermediate circuit 2, therefore advantageously does not require any complicated and costly drive procedure.

According to the invention, the drive circuit 28 as shown in FIG. 3 is used for an intermediate circuit voltage mean value $\overline{U_{DC}}$ in accordance with the formula $$\overline{U_{DC}} = \frac{U_{DC1} + U_{DC2}}{2}$$

from the first intermediate circuit voltage $U_{DC1}$ and the second intermediate circuit voltage $U_{DC2}$. To do this, the drive circuit 28 and a first averager 22, to which the first intermediate circuit voltage $U_{DC1}$ and the second intermediate circuit voltage $U_{DC2}$, which are in the form of measured variables, are supplied on the input side. Furthermore, the intermediate circuit voltage mean value $\overline{U_{DC}}$ is produced at the output of the first averager 22. The intermediate circuit voltage mean value $\overline{U_{DC}}$ and the intermediate circuit voltage nominal value $U_{DC, nom}$ are then used to form an intermediate circuit voltage difference signal, which is supplied to a first regulator 23, in particular having a proportional integral characteristic. The first regulator 23 is thus used to stabilize the intermediate circuit voltage mean value $\overline{U_{DC}}$ at the intermediate circuit voltage nominal value $U_{DC, nom}$, thus resulting in a current nominal value $I_{nom}$ being formed which, as shown in FIG. 3 is produced at the output of the first regulator 23.

Furthermore, a current mean value $\bar{I}$ is formed from n currents $I_{11}, \ldots I_{1n}; I_{21} \ldots I_{2n}$ flowing in one partial converter system 8, 9, where n=3, 4, 5, . . . and n corresponds to the number of parallel-connected branch pairs 18 in the corresponding partial converter system 8, 9. As mentioned above, n=4 in FIG. 1, and n=8 in FIG. 2. A second averager 25 is provided in order to form the current mean value $\bar{I}$ as shown in FIG. 3, to which the currents $I_{11}, \ldots I_{1n}$ or $I_{21} \ldots I_{2n}$, which are in the form of measured variables, are supplied on the input side. Furthermore, the current mean value $\bar{I}$ is produced at the output of the second averager 22. The current mean value $\bar{I}$ and the current nominal value $I_{nom}$ are used as shown in FIG. 3 to form a current difference signal, which is supplied to a second regulator 24, in particular with a proportional integral characteristic. The second regulator 24 is thus used to stabilize the current mean value $\bar{I}$ at the current nominal value $I_{nom}$ thus resulting in the formation of a drive level $\lambda$ which is produced, as shown in FIG. 3, at the output of the second regulator 24.

As shown in FIG. 3 and according to the invention, the drive level $\lambda$ is used to produce n drive signals $S_{11} \ldots S_{1n}$, corresponding to the number of branch pairs 18 in the first partial converter system 8, by means of first pulse width modulation in a first pulse width modulator 26. The drive signals $S_{11} \ldots S_{1n}$, produced in this way are produced at the output of the first pulse width modulator 26 and are supplied to the first partial converter system 8, in particular to the branch pairs 18 of the first partial converter system 8 in order to drive the corresponding power semiconductor switches 19. Furthermore, the drive level $\lambda$ is used to produce n drive signals $S_{21} \ldots S_{2n}$, corresponding to the number of branch pairs 18 in the second partial converter system 9, by means of second pulse width modulation in a second pulse width modulator 27. As shown in FIG. 3, the drive signals $S_{11} \ldots S_{1n}$ which are produced are produced at the output of the second pulse width modulator 27 and are supplied to the second partial converter system 9, in particular the branch pairs 18 in the second partial converter system 9, in order to drive the corresponding power semiconductor switches 19.

The method described above for matching the variable DC voltage according to the invention advantageously results in an essentially constant first and second intermediate circuit voltage $U_{DC1}$, $U_{DC2}$ being produced in a very simple manner by the driving of the partial converter systems 8, 9, in which case the stabilization of the intermediate circuit voltage mean value $\overline{U_{DC}}$ at the intermediate circuit voltage nominal value $U_{DC, nom}$ and the stabilization of the current mean value $\overline{I}$ of the current nominal value $I_{nom}$ furthermore make it possible to stabilize the three-point DC voltage intermediate circuit 2, in particular the two intermediate circuit voltages $U_{DC1}$, $U_{DC2}$. In addition, the two partial converter systems 8, 9, which are connected in series on the output side, and their drive in conjunction with the smoothing inductances 20 advantageously result in only very small output ripple currents being produced at the outputs 13, 14, 15, 16, which thus produce virtually no load on the three-point DC voltage intermediate circuit 2.

Overall, the converter circuit arrangement 1 according to the invention presents an extremely cost-effective solution, since it requires a minimum number of components and can thus be produced easily while making it possible to reduce costly maintenance and repair work. Furthermore, the method according to the invention for matching a variable DC voltage provides a capability to produce the essentially constant intermediate circuit voltage in the DC voltage intermediate circuit 2 in a very simple and efficient manner.

List of Reference Symbols

1 Converter circuit arrangement
2 Three-point DC voltage intermediate circuit
3 First capacitor
4 Second capacitor
5 Upper connection
6 Center point connection
7 Lower connection
8 First partial converter system
9 Second partial converter system
10 First pole
11 DC voltage source
12 Second pole
13 First output of the first partial converter system
14 First output of the second partial converter system
15 Second output of the first partial converter system
16 Second output of the second partial converter system
17 Energy store
18 Branch pair
19 Power semiconductor switch
20 Smoothing inductance
21 Branch pair inductance
22 First averager
23 First regulator
24 Second regulator
25 Second averager
26 First pulse width modulator
27 Second pulse width modulator
28 Drive circuit

What is claimed is:

1. A converter circuit arrangement for matching a variable DC voltage to a drive circuit for producing drive signals and having a three-point DC voltage intermediate circuit which is formed by a first capacitor and a second capacitor connected in series with it, with one connection of the first capacitor forming an upper connection of the three-point DC voltage intermediate circuit, and the first capacitor forming a center point connection at the junction point with the second capacitor and the second capacitor forming a lower connection of the three-point DC voltage intermediate circuit, wherein a first partial converter system and a second partial converter system are provided, with the input side of the first partial converter system being connected to a first pole of a DC voltage source which produces the DC voltage, and the input side of the second partial converter system being connected to a second pole of the DC voltage source, wherein a first output of the first partial converter system is connected to the upper connection, and a first output of the second partial converter system is connected to the lower connection, and wherein a second output of the first partial converter system is connected in series with a second output of the second partial converter system via the center point connection.

2. The converter circuit arrangement of claim 1, wherein one connection of the second capacitor forms the lower connection of the three-point DC voltage intermediate circuit.

3. The converter circuit arrangement as claimed in claim 2, wherein a capacitive energy store is connected to the first pole and to the second pole, in parallel with the DC voltage source.

4. The converter circuit arrangement as claimed in claim 2, wherein the center point connection is grounded.

5. The converter circuit arrangement as claimed in claim 2, wherein each partial converter system is formed from n parallel connected branch pairs where n=3, 4, 5, . . . , and wherein each branch pair is formed from two power semiconductor switches which can be driven and are connected in series.

6. The converter circuit arrangement as claimed in claim 5, wherein each power semiconductor switch has an integrated drive-electrode-commutated thyristor or a bipolar transistor with a drive electrode arranged in an isolated manner.

7. The converter circuit arrangement as claimed in claim 5, wherein each branch pair of the first partial converter system is connected to the first pole via a smoothing inductance which is connected to the junction point of the series-connected power semiconductor switches, and wherein each branch pair of the second partial converter system is connected to the second pole via a smoothing inductance which is connected to the junction point of the series-connected power semiconductor switches.

8. The converter circuit arrangement as claimed in claim 5, wherein a branch pair inductance of the first partial converter system is connected to the junction point of the series-connected power semiconductor switches in the branch pairs of the first partial converter system, with at least two branch pair inductances being connected to one another, and wherein a branch pair inductance of the second partial converter system is connected to the junction point of the series-connected power semiconductor switches in the branch pairs of the second partial converter system, with at least two branch pair inductances being connected to one another.

9. The converter circuit arrangement as claimed in claim 8, wherein a smoothing inductance, which is connected to the first pole, is connected to the junction point of the mutually connected branch pair inductances in the first partial converter system, and wherein a smoothing inductance, which is connected to the second pole is connected to the junction point of the mutually connected branch pair inductances in the second partial converter system.

10. A method for matching a variable DC voltage, in which a converter circuit arrangement has a three-point DC voltage intermediate circuit and is driven on the basis of drive signals from a drive circuit, which three-point DC voltage intermediate circuit is formed by a first capacitor and a second capacitor connected in series with it, with one connection of the first capacitor forming an upper connection of the three-point DC voltage intermediate circuit, and the first capacitor forming a center point connection at the junction point with the second capacitor and the second capacitor forming a lower connection of the three-point DC voltage intermediate circuit, wherein a first partial converter system of the converter circuit arrangement, which is connected on the input side to a first pole of a DC voltage source which produces the DC voltage and whose first output is connected to the upper connection and whose second output is connected to the center point connection, is driven in such a manner that a first intermediate circuit voltage, which is produced between the upper connection and the center point connection is fed to an intermediate circuit voltage nominal value which can be predetermined, and wherein a second partial converter system of the converter circuit arrangement, which is connected on the input side to a second pole of the DC voltage source and whose first output is connected to the lower connection, and whose second output is connected in series with the second output of the first partial converter system via the center point connection, is driven such that a second intermediate circuit voltage, which is produced between the lower connection and the center point connection, is set to the intermediate circuit voltage nominal value which can be predetermined.

11. The method of claim 10, wherein one connection of the second capacitor forms the lower connection of the three-point DC voltage intermediate circuit.

12. The method as claimed in claim 11, wherein an intermediate circuit voltage mean value is formed from the first intermediate circuit voltage and the second intermediate circuit voltage, and wherein a current nominal value is formed by stabilizing the intermediate circuit voltage mean value at the intermediate circuit voltage nominal value.

13. The method as claimed in claim 12, wherein a current mean value is formed from n currents flowing in one partial converter system, where n=3, 4, 5, . . . and n corresponds to the number of parallel connected branch pairs of the corresponding partial converter systems, and each branch pair is formed from two series-connected power semiconductor switches which can be driven, and wherein a drive level is formed by stabilizing the current mean value at the current nominal value.

14. The method as claimed in claim 13, wherein n drive signals corresponding to the number of branch pairs in the first partial converter system, are produced from the drive level by first pulse width modulation in a first pulse width modulator, and wherein n drive signals corresponding to the number of branch pairs in the second partial converter system are produced from the drive level by means of second pulse width modulation in a second pulse width modulator.

* * * * *